Jan. 21, 1964     F. H. LE JEUNE     3,118,484

TUBELESS TIRE RIM STRUCTURE

Filed Feb. 9, 1961

INVENTOR.

Frank H. Le Jeune

BY Harness, Dickey & Pierce

ATTORNEYS

United States Patent Office 3,118,484
Patented Jan. 21, 1964

3,118,484
TUBELESS TIRE RIM STRUCTURE
Frank H. Le Jeune, Jackson, Mich., assignor to Kelsey-Hayes Company, Detroit, Mich., a corporation of Delaware
Filed Feb. 9, 1961, Ser. No. 88,073
1 Claim. (Cl. 152—410)

This invention relates to tire rims and more specifically to an improvement in tire rims which are to be utilized with tubeless pneumatic tires.

In large wheel rims for mounting tubeless truck tires, the rim is frequently provided with a removable side ring which may be detached from the rim base to facilitate installation and removal of the tire. In such cases, it is necessary to use a sealing ring of an elastic material to prevent a loss of air between the rim base and the removable side ring. In one common type of construction, as disclosed in the United States patent to R. C. Shipman et al. 2,822,021, the sealing ring is held in place by the split metal lock ring which also holds the side ring in place. In this type of construction there is a tendency for the sealing ring to be extruded or distorted through the gap of the split lock ring by the pressure of the air which is sealed. Such distortion of the sealing ring can result in leakage of air out of the tire. There are also instances in which leakage occurs because the sealing ring is unable to conform to the shape of the parts to be sealed when such parts do not meet specified tolerance requirements. Thus, leakage could occur due to tolerance variation between different production parts and could also occur due to an irregularity in the cavity in which the sealing ring is carried.

The inability of the customary sealing ring of solid cross section to conform to shapes exceeding a given limit also causes air to be lost when the tire experiences high side loads or distortion, as during cornering. Under high side loads, the shape of the cavity is modified such that one portion of the sealing ring is under compression while another portion on the diametrically opposite side of the sealing ring is being relieved from the normal bearing pressure. If the amount of relief is sufficient, the elastic ring will be unable to maintain contact between the rim base and the side ring, with the result that the pneumatic seal will be temporarily lost.

In the tire rim construction of this invention, leakage from the last two above-named causes is prevented by providing a seal which readily adapts to a desired configuration, automatically compensating for dimensional variations, and also by providing a seal which is able to compensate for the change in shape of the sealing cavity under high side loads.

Therefore, it is an object of this invention to provide an improved rim construction for a tubeless pneumatic tire having an elastic sealing ring which is able to compensate for substantial configurational changes in the cavity during distortion of the rim or tire to continuously maintain the pneumatic seal and prevent loss of air.

It is another object of this invention to provide an improved rim construction for a tubeless pneumatic tire having an elastic sealing ring which readily conforms to the shape of the cavity provided in the rim and compensates for dimensional or configurational variations of that cavity.

It is another object of this invention to provide a rim for a tubeless pneumatic tire having an improved construction whereby the sealing ring cannot extrude through the gap in the split lock ring.

Other objects, features and advantages of the present invention will become apparent from the subsequent description and the appended claims, taken in conjunction with the accompanying drawings, in which:

FIGURE 1 is a sectional view of a rim construction for a tubeless pneumatic tire embodying the features of this invention;

FIGURE 2 is an enlarged view of a portion of the structure illustrated in FIGURE 1;

FIGURE 3 is a view taken along the line 3—3 in FIGURE 2; and

FIGURE 4 is a view of structure similarly illustrated in FIGURE 2 showing another embodiment of the present invention.

The features of this invention are shown by way of example in the drawing in which a wheel assembly 10 in FIGURE 1 has a dished hub 12 terminating in an endless annular axially extending flange portion 14 to which an endless rim base member 16 is secured by welding or other means. The hub 12 has a plurality of holes 18 in a flat face portion 20 for facilitating the mounting of the wheel assembly 10 upon a vehicle. One wall 22 of a tubeless tire 24 is held in the wheel assembly 10 by an annular tire retaining flange portion 26 located at an axial extremity of the rim base 16. The wall 22 terminates in an annular bead which is in firm contact with an annular bead seat portion 28 of the rim base 16. A removable endless side ring 30 is concentrically disposed about the extremity or side of the rim base 16 opposite the flange 26 and has an annular bead seat portion 32 in firm contact with an annular bead on the other wall 34 of the tubeless tire 24. An annular tire retaining flange portion 36 located at the axialy outward extremity of the side ring 30 holds the other wall 34 of the tubeless tire 24. The side ring 30 has an annular groove 38 extending radially outwardly from its internal diameter (FIGURE 2). In order to provide a pneumatic seal between the removable side ring 30 and the rim base 16, an endless sealing ring 40 is disposed in a cavity 42 defined by the annular groove 38 and an annular portion 44 on the external diameter of the rim base 16 confronting the groove 38. The sealing ring 40 is composed of an endless inflatable tube 46 and a valve assembly 48. The valve assembly 48 has a stem 50 extending from the groove 38 through an aperture 52 in the side ring 30. The stem 50 is fixed to the side ring 30 by a nut 54 in an accessible area and thus provides means for inflating the tube 46 in a conventional manner. The tube 46 is so shaped in cross-section that upon inflation it will assume the shape of the cavity 42 and will thereby provide a pneumatic seal between the rim base 16 and the side ring 30 by conforming to the shape of the groove 38 (FIGURE 3) and by firmly seating against the confronting annular portion 44. With this type of sealing ring 40, slight irregularities occurring between different production parts or occurring annularly in the shape of the cavity 42 in a given rim assembly will be automatically compensated by the mating action of the inflatable tube 46 as it is pressurized. When side loads are experienced on the tire, a portion of the cavity 42 becomes constricted and a diametrically opposite portion is relieved. The portion of the tube 46 in the constricted portion of the cavity 42 becomes reduced in volume and still assumes the configuration of the cavity, thus maintaining a pneumatic seal there. The portion of the tube 46 in the relieved portion of the cavity increases its volume, by virtue of the internal pressure, and assumes the altered configuration of the cavity, thus maintaining the pneumatic seal in that area. Thus, will the sealing means as described, a pneumatic seal is maintained between the rim base 16 and the side ring 30 despite the occurrence of side loads of large magnitude in the tire or other distortion of the rim or tire.

The side ring 30 and the rim base 16 are secured together by an annular split lock ring 56 (FIGURE 2). The ring 56 is held on the rim base 16 by an annular radially outwardly extending lip portion 58 of a gutter 60 and is split in order to facilitate assembly over the lip 58. The split ring 56 has a side wall 62 confronting and engageable with an annular shoulder 64 on the axially outward side of the continuous side ring 30. When the pneumatic tire 24 is pressurized, the force of the pressure tends to move the side ring 30 axially outwardly, forcing the shoulder 64 into engagement with the wall 62. Any further axial movement is prevented by the action of the ring 56 against the lip 58 and a positive air-tight seal is provided by the action of the inflated sealing ring 40 as described.

With the above described construction, there is no physical contact between the elastic tube 46 of rubber or the like and the split lock ring 56. Thus, there is no chafing between the split ring 56 and the inflatable tube 46 and, also, the possibility of any extrusion of the tube 46 through the gap in the split lock ring 56 is eliminated.

A modified construction of an improved rim assembly is shown in FIGURE 4 in which a rim assembly 10a has an endless side ring 30a concentrically disposed about one side of an endless rim base 16a. The rim base 16a has an annular groove 38a extending radially inwardly from its external diameter. In order to provide a pneumatic seal between the removable side ring 30a and the rim base 16a, and endless sealing ring 40a is disposed in a cavity 42a defined by the annular groove 38a and an annular portion 43a on the internal diameter of side ring 30a confronting the groove 38a. The sealing ring 40a (FIGURE 4) is composed of an endless inflatable tube 46a and a valve assembly 48a. The valve assembly 48a extends from the groove 38a through an aperture 52a in the rim base 16a, thus providing means for inflating the tube 46a in a conventional manner. Upon inflation, the inflatable tube 46a has a configuration which conforms essentially to the shape of the cavity 42a and provides a pneumatic seal despite dimensional variations occurring between the rim base 16a and the side ring 30a. Thus, this type of construction has the same advantages as discussed in regards to the previous embodiment. Note that the valve assembly 48a extends radially inwardly through the rim base 16a and is located axially inwardly from one side of and within the radially inner confines of the rim base 16a whereby the valve assembly 48a is protected from damage during assembly of the rim assembly and also from foreign objects during use.

The side ring 30a and the rim base 16a are secured together by an annular split lock 56a (FIGURE 4). The split ring 56a is held to the rim base 16a in an annular gutter 60a on rim base 16a in the same manner as discussed with reference to the first embodiment.

While it will be apparent that the preferred embodiments herein illustrated are well calculated to fulfill the objects above stated, it will be appreciated that the invention is susceptible to modification, variation and change without departing from the proper scope or fair meaning of the subjoined claim.

What is claimed is:

A rim for a tubeless pneumatic tire comprising: an endless rim base member having a radially inwardly extending groove therein, an endless side ring member disposed about one side of said rim base member, said groove and an annular portion of said side ring member confronting said groove defining an annular cavity, sealing means for providing a pneumatic seal between said rim base member and said side ring member comprising an inflatable elastic tube conformably seated in said cavity, a valve assembly for pressurizing said tube independently of the tire and having a valve stem extending radially inwardly through said rim base member and located axially inwardly from said one side of and within the radially inner confines of said rim base member whereby said valve stem is protected from damage during assembly of said rim and from foreign objects, an annular split lock ring axially outwardly spaced from said inflatable tube and located about said one side of said rim base member for restraining said side ring member, and retaining means on said one side of said rim base member for holding said lock ring.

References Cited in the file of this patent

UNITED STATES PATENTS

| | | |
|---|---|---|
| 507,089 | Owen | Oct. 17, 1893 |
| 2,394,290 | Butler | Feb. 5, 1946 |
| 2,559,564 | Sperling | July 3, 1951 |
| 2,648,554 | Gilbert | Aug. 11, 1953 |
| 2,788,050 | LeJeune | Apr. 9, 1957 |
| 2,822,021 | Shipman et al. | Feb. 4, 1958 |